United States Patent
Somol et al.

(10) Patent No.: US 12,160,429 B2
(45) Date of Patent: *Dec. 3, 2024

(54) LEARNING OF MALICIOUS BEHAVIOR VOCABULARY AND THREAT DETECTION THROUGH BEHAVIOR MATCHING

(71) Applicant: Cisco Technology, Inc., San Jose, CA (US)

(72) Inventors: Petr Somol, Marianske Lazne (CZ); Martin Kopp, Beround (CZ); Jan Kohout, Roudnice Nad Labem (CZ); Jan Brabec, Rakovnik (CZ); Marc René Jacques Marie Dupont, Prague (CZ); Cenek Skarda, Prague (CZ); Lukas Bajer, Somerset, WI (US); Danila Khikhlukha, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,517

(22) Filed: Jul. 24, 2023

(65) Prior Publication Data

US 2024/0106836 A1 Mar. 28, 2024

Related U.S. Application Data

(63) Continuation of application No. 16/831,197, filed on Mar. 26, 2020, now Pat. No. 11,750,621.

(51) Int. Cl.
*H04L 9/40* (2022.01)
*G06N 3/045* (2023.01)
*G06N 3/08* (2023.01)

(52) U.S. Cl.
CPC ............. *H04L 63/14* (2013.01); *G06N 3/045* (2023.01); *G06N 3/08* (2013.01)

(58) Field of Classification Search
CPC ........... H04L 63/14; G06N 3/045; G06N 3/08
See application file for complete search history.

(56) References Cited

U.S. PATENT DOCUMENTS

| 10,540,446 B2 * | 1/2020 | DeFelice | G06N 7/01 |
| 11,108,787 B1 * | 8/2021 | Shen | G06N 3/044 |

(Continued)

FOREIGN PATENT DOCUMENTS

EP 3591584 1/2020

OTHER PUBLICATIONS

Chebbi, Chiheb, "How to Fool Machine Learning M alware Detectors Using Generative Adversarial Networks (GANs)", online: https://www.codeproject.com/Articles/1260883/How-to-fool-Machine-Learning-malware-detectors-usi, Sep. 2018, 6 pages.

(Continued)

*Primary Examiner* — Beemnet W Dada
(74) *Attorney, Agent, or Firm* — BEHMKE INNOVATION GROUP LLC; James M. Behmke; James J. Wong

(57) ABSTRACT

In one embodiment, a device obtains input features for a neural network-based model. The device pre-defines a set of neurons of the model to represent known behaviors associated with the input features. The device constrains weights for a plurality of outputs of the model. The device trains the neural network-based model using the constrained weights for the plurality of outputs of the model and by excluding the pre-defined set of neurons from updates during the training.

21 Claims, 10 Drawing Sheets

(56) References Cited

U.S. PATENT DOCUMENTS

| | | |
|---|---|---|
| 2018/0285740 A1 | 10/2018 | Smyth et al. |
| 2019/0166141 A1 | 5/2019 | Xu et al. |
| 2019/0188065 A1 | 6/2019 | Anghel et al. |

OTHER PUBLICATIONS

Courbariaux, et al., "Binerized Neural Networks: Training Neural Networks with Weights and Activations Constrained to +1 or −1", online: https://arxiv.org/pdf/1602.02830.pdf, Mar. 2016, 11 pages.

Heinrich, Greg, "Photo Editing with Generative Adversarial Networks", online: https://devblogs.nvidia.com/photo-editing-generative-adversarial-networks-1/, Apr. 2017, 19 pages.

Kim, et al., "Zero-Day Malware Detection Using Transferred Generative Adversarial Networks Based on Deep Autoencoders", online: http://sclab.yonsei.ac.kr/publications/Papers/IJ/2018_IS_JYK.pdf, May 2018, 20 pages.

Mirza, et al., "Conditional Generative Adversarial Nets", online: https://arxiv.org/pdf/1411.1784.pdf, Nov. 2014, 7 pages.

Pevný, et al., "Discriminative Models for Multi-Instance Problems with Tree-Structure", online: https://arxiv.org/pdf/1703.02868.pdf, Mar. 2017, 9 pages.

Radford, et al., "Unsupervised Representation Learning with Deep Convolutional Generative Adversarial Networks", online: https://arxiv.org/pdf/1511.06434.pdf), Jan. 2016, 16 pages.

Wang, et al., "Learning Robust Global Representations by Penalizing Local Predictive Power", online: https://arxiv.org/pdf/1905.13549.pdf, Nov. 2019, 19 pages.

Wu, et al., "Generating Adversarial Malware Examples for Black-Box Attacks Based on GAN", online: https://arxiv.org/pdf/1702.05983.pdf, Feb. 2017, 7 pages.

Devlin, Jacob et al. "BERT: Pre-training of Deep Bidirectional Transformers for Language Understanding." North American Chapter of the Association for Computational Linguistics (2019).

Wang, Alex et al. "Glue: A Multi-Task Benchmark and Analysis Platform for Natural Language Understanding." BlackboxNLP@EMNLP (2018).

Radford, Alec and Karthik Narasimhan. "Improving Language Understanding by Generative Pre-Training." (2018).

Rebuffi, Sylvestre-Alvise et al. "Learning multiple visual domains with residual adapters." ArXiv abs/1705.08045 (2017): n. pag.

Stickland, Asa Cooper and Ian Murray. "BERT and PALs: Projected Attention Layers for Efficient Adaptation in Multi-Task Learning." arXiv:1902.02671 (2019).

Rebuffi, Sylvestre-Alvise et al. "Efficient Parametrization of Multi-domain Deep Neural Networks." 2018 IEEE/CVF Conference on Computer Vision and Pattern Recognition (2018): 8119-8127.

Kirkpatrick, James et al. "Overcoming catastrophic forgetting in neural networks." Proceedings of the National Academy of Sciences 114 (2016): 3521-3526.

Houlsby, Neil et al. "Parameter-Efficient Transfer Learning for NLP." arXiv:1902.00751 (2019).

Li, Yuanzhi et al. "Recovery guarantee of weighted low-rank approximation via alternating minimization" arXiv:1602.02262 (2016).

* cited by examiner

LEARNING OF MALICIOUS BEHAVIOR VOCABULARY AND THREAT DETECTION THROUGH BEHAVIOR MATCHING

CROSS-REFERENCE TO RELATED APPLICATION

This application is a continuation of U.S. patent application Ser. No. 16/831,197, filed on Mar. 26, 2020, entitled LEARNING OF MALICIOUS BEHAVIOR VOCABULARY AND THREAT DETECTION THROUGH BEHAVIOR MATCHING, by Petr Somol et al., the entire contents of which are incorporated by reference herein.

TECHNICAL FIELD

The present disclosure relates generally to computer networks, and, more particularly, to the learning of malicious behavior vocabulary and threat detection through behavioral matching.

BACKGROUND

Malware now exists in many forms and presents an ever-present threat to network security and operations. For example, some malware exists to simply exfiltrate sensitive data from the network such as financial information, trade secrets, and the like. Other forms of malware instead seek to disrupt the functioning of the network. For example, some malware may launch a distributed denial of service (DDoS) attack a particular service in the network, so as to overwhelm the service and prevent other clients from accessing the service.

In some cases, behavioral analytics can be used to detect malicious behaviors in a network, such as those associated with malware. However, there is a lack of automation in the analysis and understanding of network/endpoint/cloud threats. This is true for both the discovery of what behavioral definitions/signatures that may be relevant for threat detection, in general, as well as for the discovery of concrete behavior combinations signifying concrete threats.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
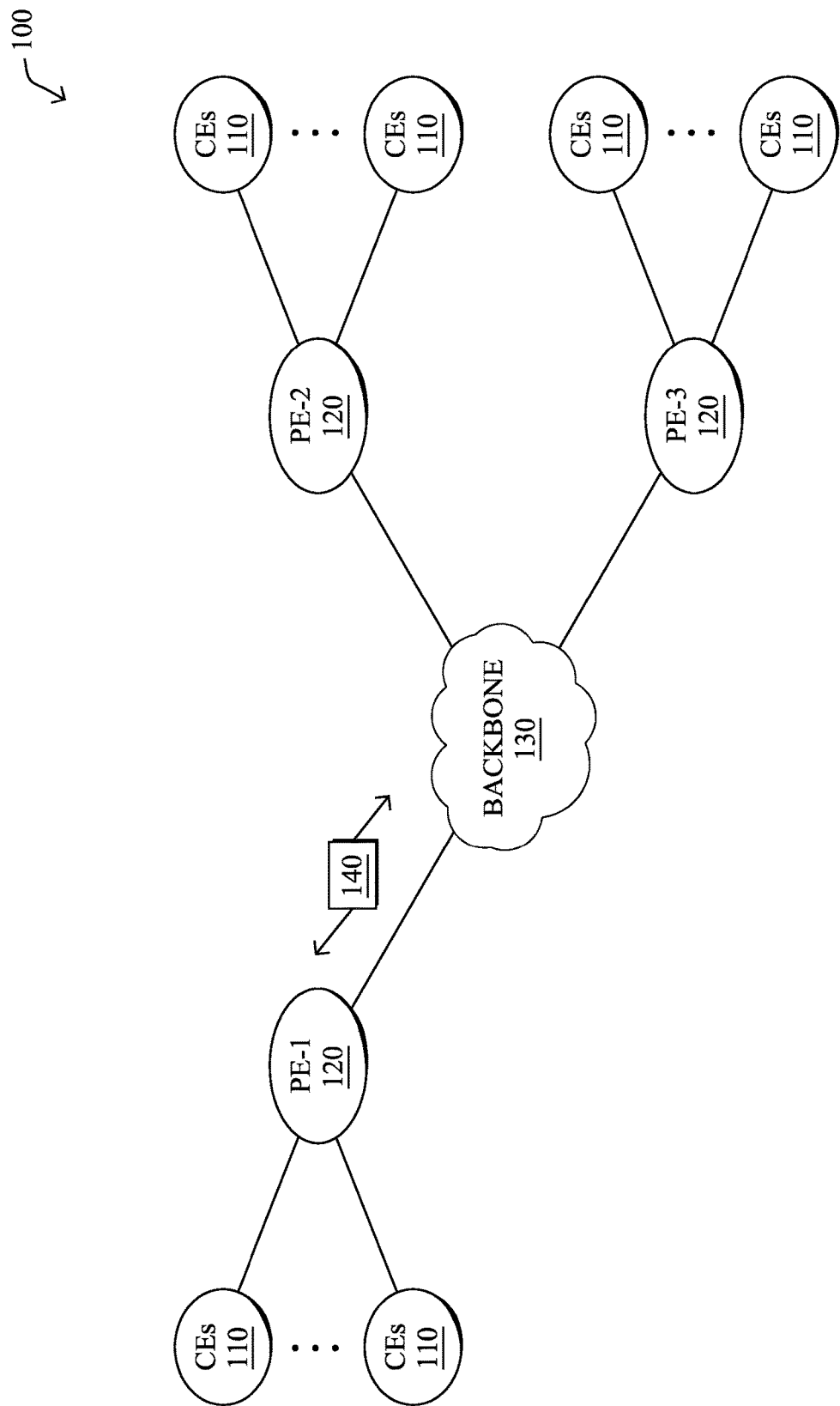
FIGS. 1A-1B illustrate an example computer network.

According to one or more embodiments of the disclosure, a device obtains input features for a neural network-based model. The device pre-defines a set of neurons of the model to represent known behaviors associated with the input features. The device constrains weights for a plurality of outputs of the model. The device trains the neural network-based model using the constrained weights for the plurality of outputs of the model and by excluding the pre-defined set of neurons from updates during the training.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using pre-defined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network using a CE router with two MPLS VPN links (e.g., from different service providers), with potentially a backup link (e.g., a 3G/4G/5G/LTE connection). A site of type B may itself be of different types:
2a.) Site Type B1: a site connected to the network using two MPLS VPN links (e.g., from different service providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
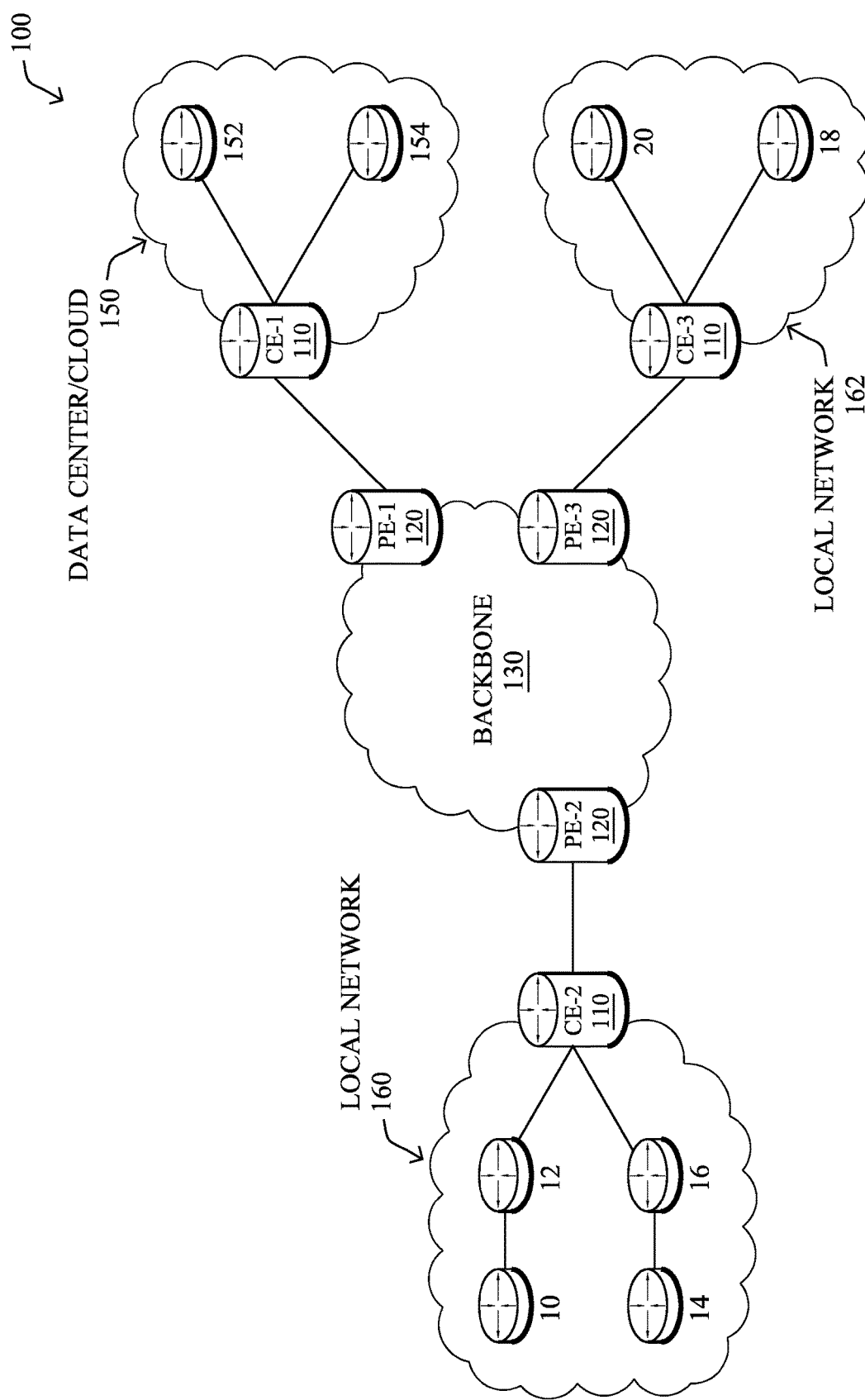

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
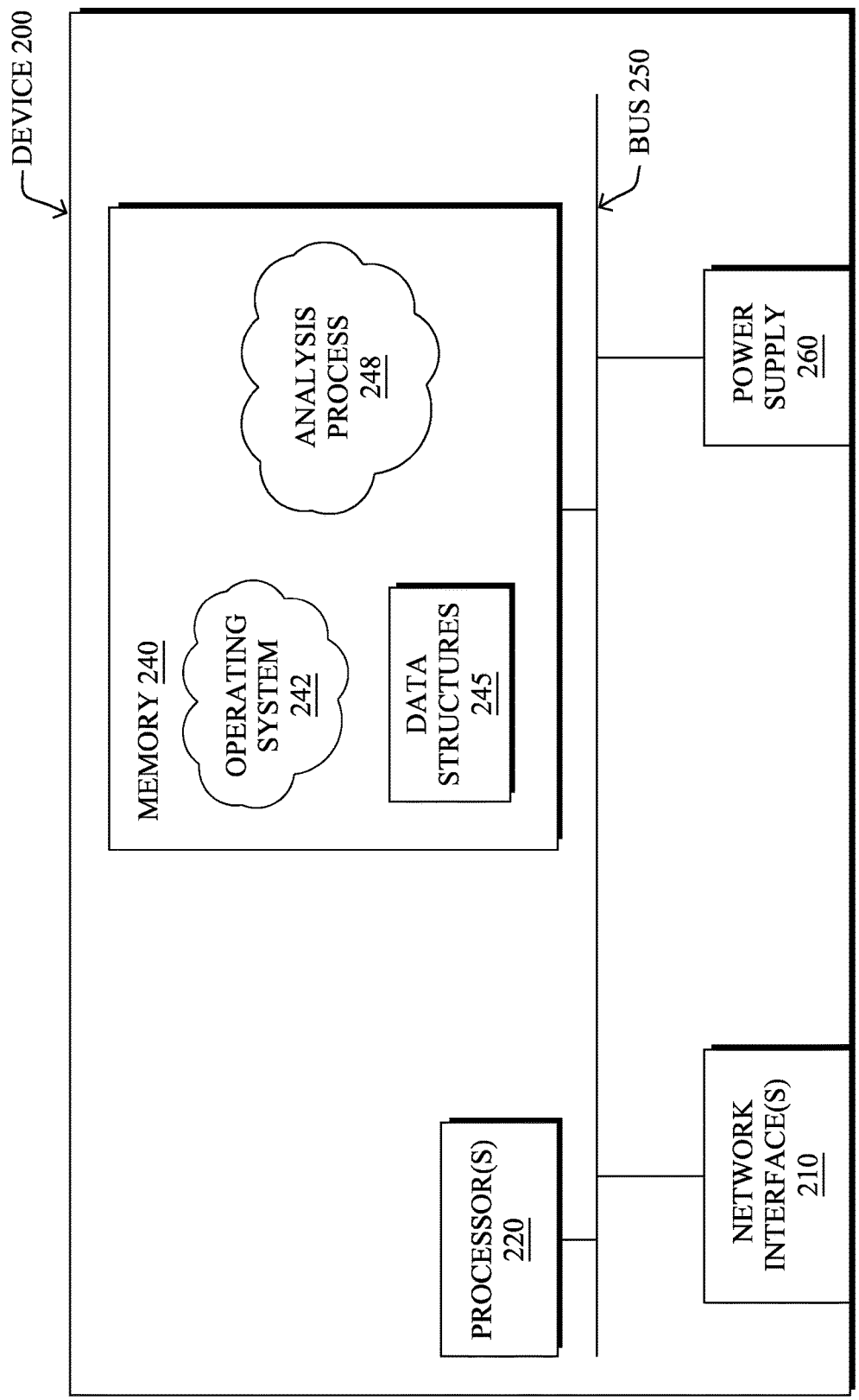
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, analysis process 248 may execute one or more machine learning-based models, to assess the conditions in a computer network and/or of a particular device in the network. For example, analysis process 248 may assess the traffic associated with that device, the binaries/executables executed by that device, log data from that device (e.g., events captured in the system log of the device), or the like, to identify malicious conditions in the computer network. For example, analysis process 248 may identify the presence of different forms of malware in the network, such as, but not limited to, ransomware, Trojans, adware, and the like.

In some embodiments, analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like.

Analysis process 248 may employ any number of machine learning techniques, to perform its analysis. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, analysis process 248 can use the model M to classify new data points, such as information regarding new traffic flows, devices, users, or processes in the network. Often, M is a statistical model, and the cost function is inversely proportional to the likelihood of M, given the input data.

In various embodiments, analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that has been labeled with an associated process, device, or user, if known. On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), artificial neural networks (ANNs) (e.g., convolutional neural networks, deep learning networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

Figure 3:
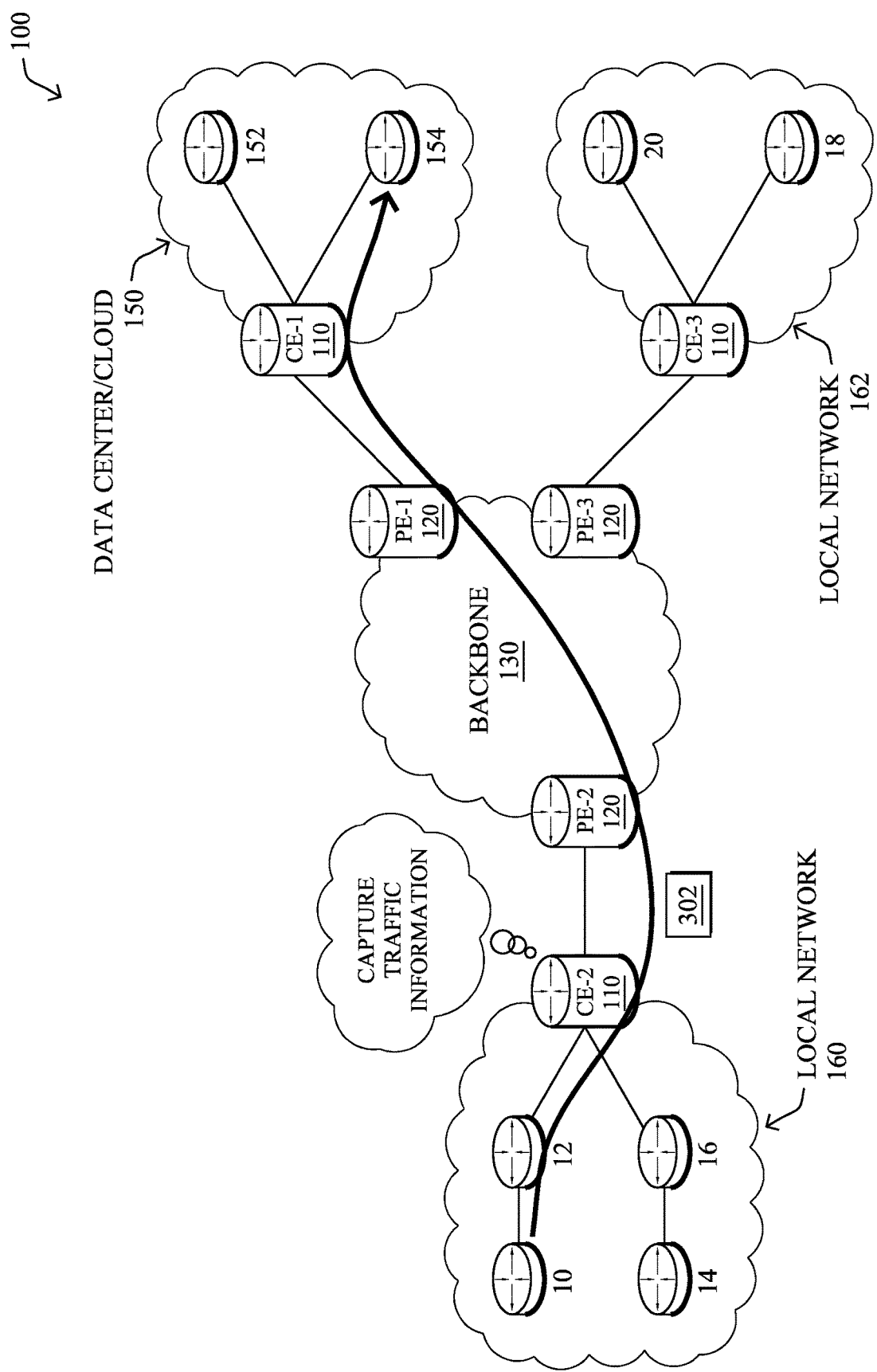
FIG. 3 illustrates an example of a device capturing traffic information.

As shown in FIG. 3, various mechanisms can be leveraged to capture information for assessment by analysis process 248. For example, in the case of analysis process 248 analyzing traffic in a computer network, telemetry data can be captured for assessment by device 200. As shown, assume that client node 10 initiates a traffic flow with remote server 154 that includes any number of packets 302. Any number of networking devices along the path of the flow may analyze and assess packet 302, to capture telemetry data regarding the traffic flow. For example, as shown, router CE-2 through which the traffic between node 10 and server 154 flows may capture telemetry data regarding the traffic flow. In turn, these networking devices can provide the captured telemetry data to a particular device (e.g., a device 200) for assessment by analysis process 248.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, a networking device may also assess the payload of the packet to capture information about the traffic flow. For example, router CE-2 or another device may perform deep packet inspection (DPI) on one or more of packets 302, to assess the contents of the packet. Doing so may, for instance, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow for analysis. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

In further embodiments, an agent executed directly on node 10 could capture the telemetry data used as input for analysis process 248. For example, such an agent may report system log data, data regarding binaries/executables run on node 10, or the like, for analysis by the device executing analysis process 248.

As noted above, even with the advent of machine learning, there is still a lack of automation in the analysis and understanding of network/endpoint/cloud threats. In particular, techniques today still require the manual discovery of what behavioral definitions may be relevant for threat detection. In addition, current approaches also require the manual discovery of concrete behavior combinations signifying concrete threats. More specifically, both of these tasks now rely on extensive human analytics work, which does not scale well when a new type of telemetry or a new type of threat needs to be covered. Due to reliance on human experience both tasks also cannot guarantee that the behavior vocabulary (e.g., the different types of behavior that may be observed), as well as the descriptions of the different types of threats, will be complete. To date, though, systems that still rely on human experience to define behaviors and threats are unsurpassed with respect to explainability to a user of the system (e.g., network security personnel, administrators, etc.).

Learning of Malicious Behavior Vocabulary and Threat Detection Through Behavioral Matching The techniques herein introduce automation solutions that are able to generate explainable behaviors without requiring each behavior to be defined by a human expert. In some aspects, the techniques herein may help to build an explainable vocabulary of malicious behaviors from arbitrary telemetry data and aid in explaining threats using that vocabulary. To do so, the techniques herein may build on pre-existing human expertise to accelerate the search for the principles of malicious behaviors and dissect known threat into such behaviors.

Specifically, according to one or more embodiments of the disclosure as described in detail below a device obtains input features for a neural network-based model. The device pre-defines a set of neurons of the model to represent known behaviors associated with the input features. The device constrains weights for a plurality of outputs of the model. The device trains the neural network-based model using the constrained weights for the plurality of outputs of the model and by excluding the pre-defined set of neurons from updates during the training.

Illustratively, the techniques described herein may be performed by hardware, software, and/or firmware, such as in accordance with the analysis process 248, which may include computer executable instructions executed by the processor 220 (or independent processor of interfaces 210) to perform functions relating to the techniques described herein.

Operationally, the techniques herein provide for the construction of a neural network-based machine learning model that is capable of learning under human-defined constraints, according to various embodiments. In general, the goal of these constraints is to enable the reuse of existing expert knowledge by the model, while still maximizing the interpretability of any new behaviors learned by the model.

Figure 4:
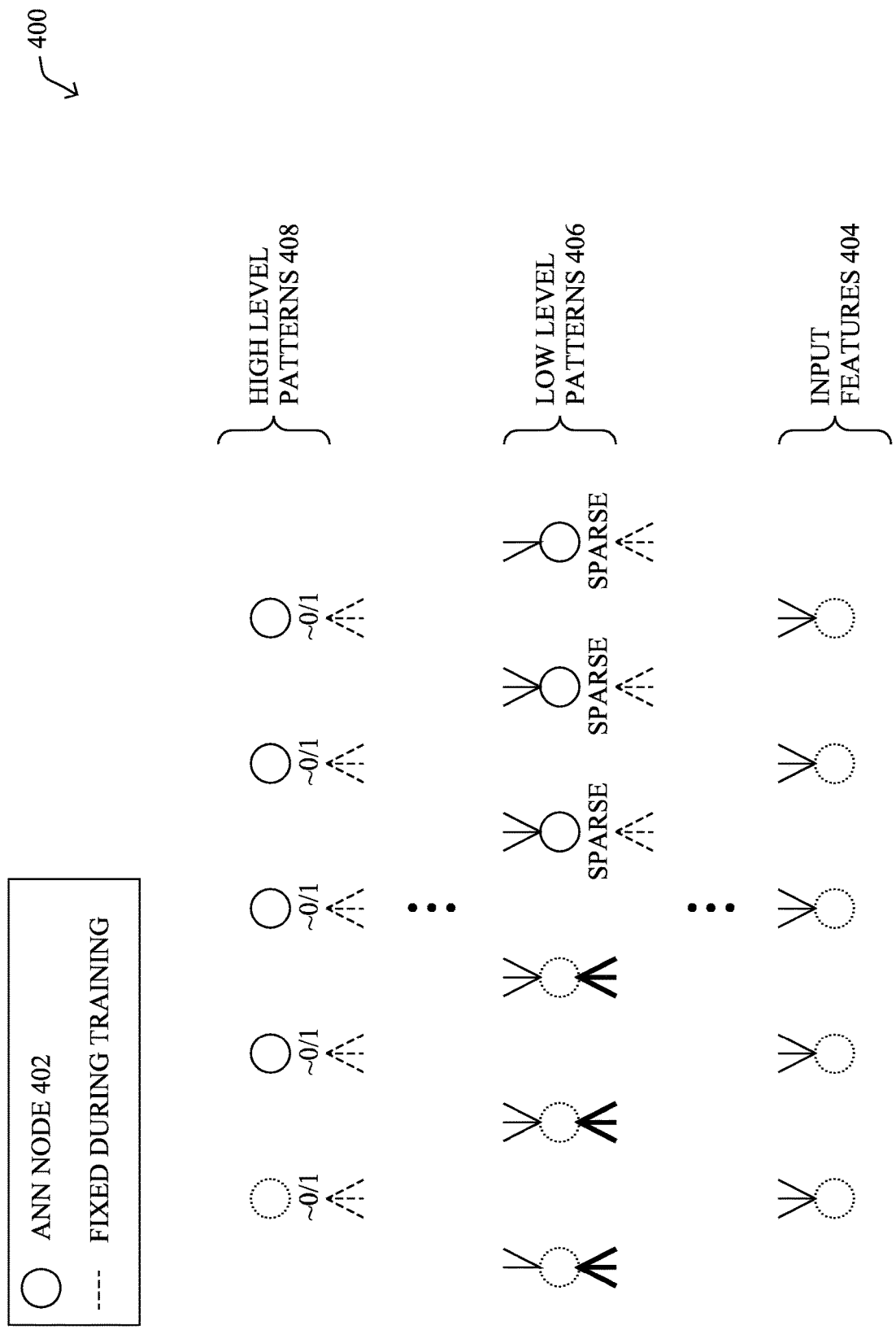
FIG. 4 illustrates an example neural network.

FIG. 4 illustrates an example of a neural network 400, in accordance with the teachings herein. As shown, assume that neural network 400 comprises a plurality of ANN nodes 402 that are linked during model training by a plurality of neurons. In various embodiments, neural network 400 may include a set of ANN nodes 402 that represent input features 404 obtained from the telemetry data being analyzed. For example, in some embodiments, the input features 404 may comprise event codes that represent different events that may be observed in the network or on a particular device in the network.

As shown, there may be one or more layers of ANN nodes 402 and their corresponding neurons (e.g., their interconnections) that represent low level patterns/behaviors 406 of the network or device under scrutiny. In general, the neurons in these one or more middle layers cover the vocabulary of behaviors and should, as a goal, be such that they are explainable to an end user.

Finally, neural network 400 may include an output layer of ANN nodes 402 that represent the high level patterns 408 (e.g., behaviors) of interest. Often, these take the form of classification labels that can be applied to different sets of input features 404. For example, one high level pattern 408 may be "legitimate," while another may be "generic trojan." Thus, the neurons formed during the training of neural network 400 between ANN nodes 402 may represent the associations between the input features obtained from the network or device under scrutiny, the low level patterns/behaviors exhibited by the network or device, and the high level patterns/behaviors that categorize the low level patterns/behaviors.

Note that the example neural network 400 in FIG. 4 is shown with just two levels of learned patterns for purposes of simplification and that other models may use a deeper hierarch.

According to various embodiments, training of neural network 400 may entail first defining a set of constraints for the training such that existing expert knowledge is leveraged when learning new behaviors, while still maximizing the explainability/interpretability of such behaviors. In various embodiments, these constraints may include any or all of the following:

1. Input features 404 should be selected/defined to be understandable by human analyst, from the very beginning.

2. Some of the neurons for low level patterns 406 can be pre-defined and fixed during the training of neural network 400. In other words, such pre-defined neurons may be excluded from updates during the learning/training process. However, their very existence will still affect the learning of other neurons in neural network 400. Conversely, the remaining neurons in neural network 400 are still subject to updates during the learning/training process. In one embodiment, some or all of these types of neurons may also be regularized, to promote dependence only on a low/sparse number of input features 404, each.

3. Weights for high level patterns 408 may be regularized during the learning/training process to allow for binary or near-binary contributions of inputs from low level patterns 406. This is to increase the explainability/interpretability of the learned patterns/behaviors as that are clearly signified by the presence of a well-defined selection of low level patterns 406. In some embodiments, even at the layer of high level patterns 408, a limited number of one or more neurons of neural network 400 may be fixed during the learning/training process, to represent higher level events/conditions that were specified by a human expert.

As would be appreciated by one skilled in the art of machine learning, the above approach to model learning/training will have a number of different effects. First, learning in the basic discriminatory case (e.g., neural network 400 is trained as classifier that distinguishes malware from non-malware) will still optimize the classification accuracy of the resulting model. At the same time, though, the model can still learn weights in some neurons given pre-defined constraints (e.g., fixed weights) on other neurons. Note that such constraints will lead to a classification accuracy that is not maximized but, instead, accepts this as a tradeoff so that the learned patterns are interpretable by an end user.

Indeed, the results of the above constrained learning approach will be that the neurons in the upper layer(s) may represent higher level malicious activity, which would remain explainable by a 0/1 presence of lower-level behaviors. Neurons in the middle layer(s) would cover the vocabulary of behaviors, consisting of behaviors pre-specified by an expert (and fixed throughout the whole learning process), as well as behaviors learned by the model. Thus, the learned behaviors will complement the pre-specified ones so as to enable widest possible coverage of descriptions of malicious activity using the behavior vocabulary.

The problem of encoding expert knowledge into pre-specified neural representations can be approached in multiple ways. In one embodiment, the naïve and minimal approach would be to, for a given and known behavior, have the expert provide samples of that behavior. In turn, these samples can be transformed using a neural auto-encoder into a form (e.g., inner neuron weights) that is directly transferrable to the constrained model (e.g., neural network 400). In another embodiment, the expert may set the weights manually for any of the known behaviors.

In addition to discriminatory models, the techniques herein are also applicable to generative ones. Generally speaking, generative models are quite useful for the (unsupervised) learning of significant patterns in arbitrary data. As such, they have the potential for many uses in the field of cybersecurity where there is a large abundance of complex data with very limited possibilities for insight into them (e.g., network telemetry of different types, content, system logs, etc.). However, generative models are also typically harder to learn than discriminative models. If successful, though, they can provide much more robust insight into all properties of the modelled data.

Figure 5:
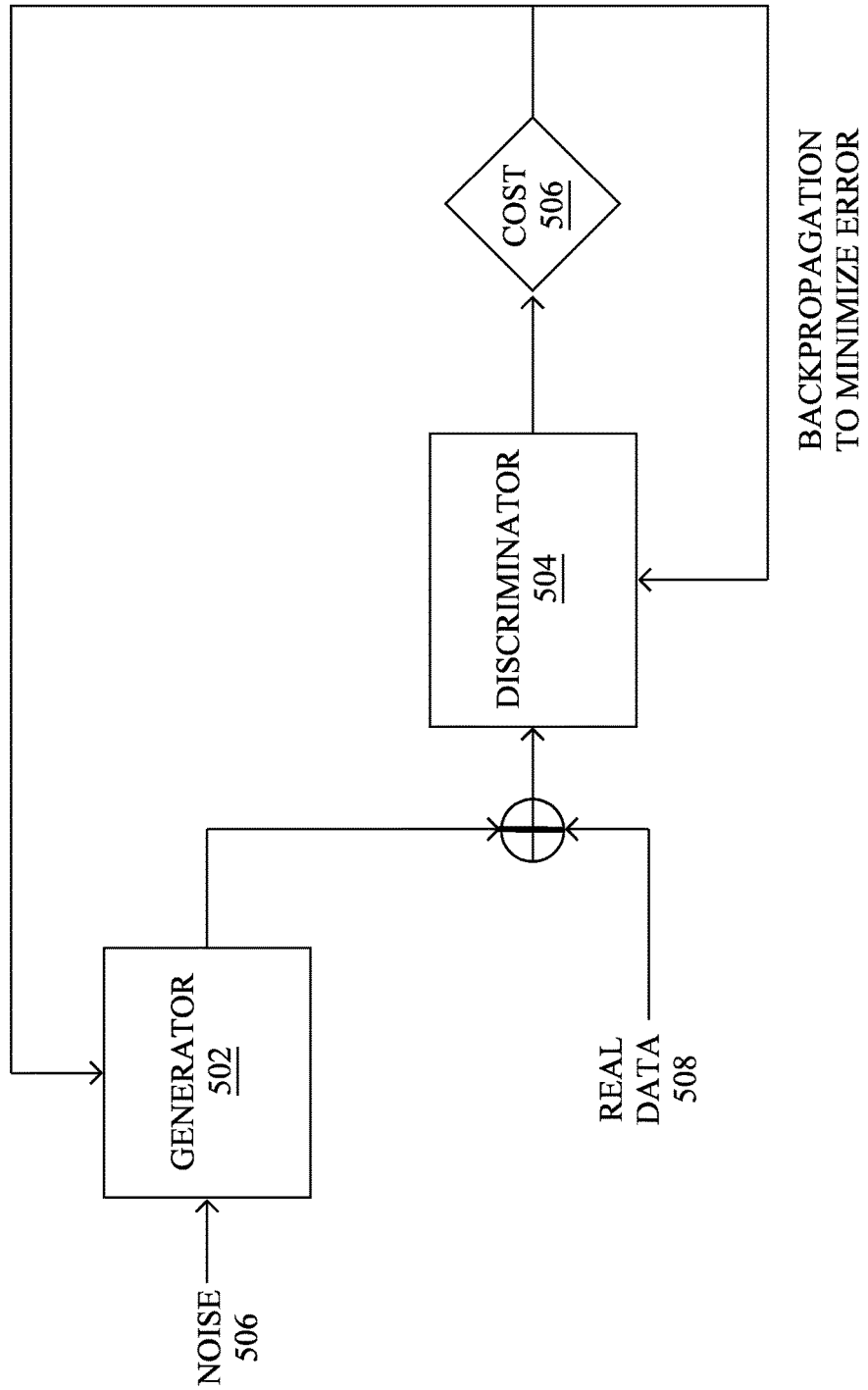
FIG. 5 illustrates an example generative adversarial network (GAN)

Currently, the most powerful, if not yet fully understood, generative models are generative adversarial networks (GANs). With GANs, the robustness of the learned model is due to competition between a concurrently learned generator and a discriminator trying to recognize the insufficiencies of the generator. FIG. 5 illustrates an example GAN 500 in which the techniques herein could also be applied, in further embodiments.

As shown, GAN 500 may generally include a generator 502 and a discriminator 504. During the learning/training phase, generator 502 may attempt to generate data that is indistinguishable from real data 508, given noise 506. Conversely, discriminator 504 may attempt to distinguish the data generated by generator 502 and real data 504. In other words, discriminator 504 will attempt to assess how well generator 502 is able to model real data 508. By applying a cost function 506, backpropagation can be provided to both generator 502 and to discriminator 504 (e.g., to minimize the error of discriminator 504 and maximize the error of generator 502). The training process is then complete when both generator 502 and discriminator 504 reach a state of equilibrium.

By applying the same constraints as in the discriminative case above to GAN 500, a model can be learned using GAN 500 that better expresses the behavioral vocabulary. In the context of cybersecurity, this means that the learned behavioral vocabulary will better cover the threat landscape in terms of interpretable malware descriptions using different combinations of device and/or network behaviors.

The use of a GAN in the manner proposed herein may operate under the assumption that there are known definitions of malware in terms of their behaviors. It is also assumed that, while the overall training criterion can remain the fit of model to data (e.g., the ability to generate samples unrecognizable from real samples in the case of a GAN), the idea of pre-specified patterns in neurons actually enables to "encode" known malicious behaviors and their combinations into the overall model. Some forms of semi-supervised generative models may enable the use of a limited number of labels, in addition to the training data itself. This would fit well with cybersecurity use cases where labels are often scarce and expensive while the data itself can be quite large.

Of course, in the generative case, the representation of the generated samples may take various forms. In some cases, they may take the form of constant size vectors or matrices, which is commonly done in the case of image and audio analysis. However, in the context of cybersecurity, it is often hard to represent an arbitrary selection of telemetry or other cybersecurity data which is commonly irregular in nature. Depending on the data involved, a simplification could be to allow a fixed size output vector to encode a minimum number of behaviors. Alternatively, the output could take the form of attack graphs, in a further embodiment.

As would be appreciated, the teachings herein are well suited for the analysis of network telemetry data, such as proxy logs, NetFlow or IPFIX data, and the like. In these cases, example behaviors may include, but are not limited to, any or all of the following: contacting a combination of domains/IPs, uploading larger amount of data (e.g., above a threshold), performing port scanning, and the like. Example security events can also include, but are not limited to, any or all of the following: botnet related communications, command and control (C&C) channels, lateral scanning, and the like. Malware samples can be obtained, e.g., in the form of packet captures (PCAPs).

Individual samples for generative modelling can be defined in various ways. For example, one simple way would be to consider chunks of traffic from a single client to a single server according to some specified time window (e.g., every 5 minutes). Note, however, that behaviors in the network telemetry are not yet fully understood. Thus, the automated learning of a behavioral vocabulary and description of threats can be of great value to security personnel.

Note also that some features may not be directly encoded in the telemetry consumed by an intrusion detection system (IDS). For example, the age of a domain with which a client communicates, the Alexa rank of the domain, or the like, is typically not captured in the network telemetry data itself. In such cases, this additional information could be provided to the discriminator of the generative model, so as to evaluate whether it should stay fixed or be manipulated by the discriminator. Doing so could, potentially, further improve robustness.

In another embodiment, the techniques herein are equally applicable to the analysis of system logs that indicate events that have occurred on a particular device. In such cases, example behaviors may include, but are not limited, any or all of the following: a process launching another process, a process creating a file in an unusual location, or the like. For example, a security event in this context may entail Microsoft Word launching Powershell and, through Powershell, runs a script that downloads a file.

In a further embodiment, the techniques herein could also be used to analyze the behaviors of binaries/executables run on a particular device. In such a case, the behavior vocabulary to learn would consist of malicious code snippets or other internal binary structures. Example behaviors in this case may include, but are not limited to, any or all of the following: the beginning of some code contains a jump to the end of file followed by a short sequence of instructions, then followed by a return to the beginning; the code including sequences of instructions with no effect that signify obfuscation, and the like.

In yet another embodiment, another potential use case for the teachings herein would be to analyze messages, such as e-mail, text messages, and the like. Here, the vocabulary to learn may include natural language patterns in message body and/or patterns in the metadata of the message.

As would be appreciated, the use cases above are merely exemplary in nature and the teachings herein are not limited to any particular use case scenario. Indeed, the teachings herein could be used to train neural network-based models for any number of different purposes, so long as one of the goals of the model is to produce an explainable/interpretable behavior vocabulary.

A prototype was created to demonstrate the efficacy of the teachings herein. In particular, the detection layer of an existing network security system was used as input for a multilayer perceptron (MLP) neural network. 100,000 samples with 8 different malware families (e.g., Information Stealer, Trojans, Banking Trojans, Ransomware, etc.). After 200 training periods, the model was able to achieve an accuracy greater than 99%, with the majority of the misclassified samples being samples with only a very small number of samples in the training set.

Figure 6A:
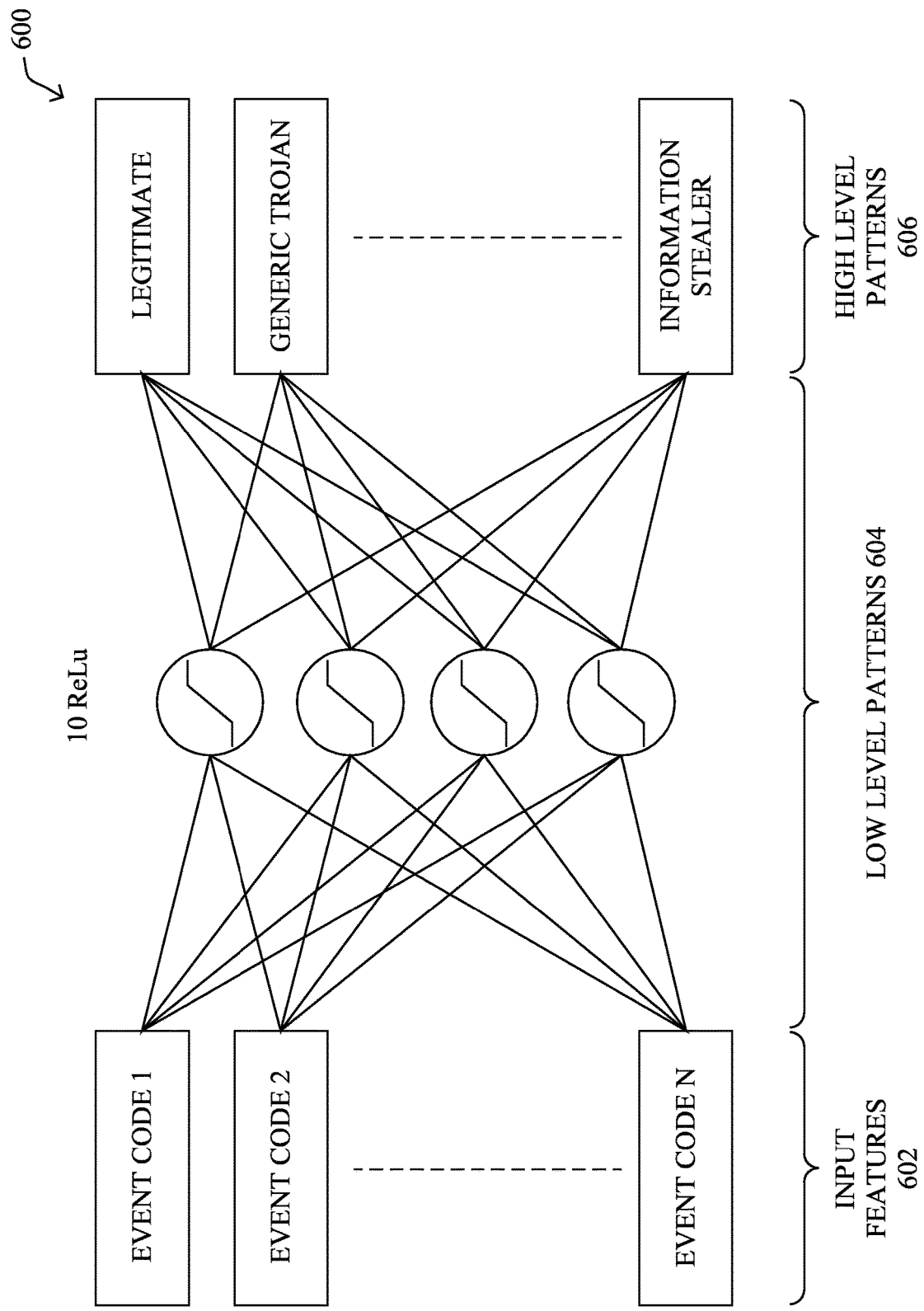
FIGS. 6A-6C illustrate examples of a prototype system implementing the techniques herein.

FIG. 6A illustrates an example of the neural network 600 used during prototyping, in various embodiments. As shown, the input features 602 for neural network 600 were selected as a set of cognitive events for a user per day and represented as a binary feature vector. The neural network 600 was trained as an MLP neural network with 220, 10, and 8 neurons, in its input, hidden, and output layers, respectively. Rectified linear units (ReLu) units and Adam learning algorithms were also used. The output layer of neural network 600 reflected high level patterns 606 representing legitimate behavior and different types of malware (e.g., generic Trojan, Information Stealer, etc.), while the middle layer represented the low level patterns 604. Constraints were placed on the neurons corresponding to the known behaviors, in accordance with the teachings herein, thereby allowing neural network 600 to learn the other neurons and develop a behavior vocabulary.

Figure 6B:
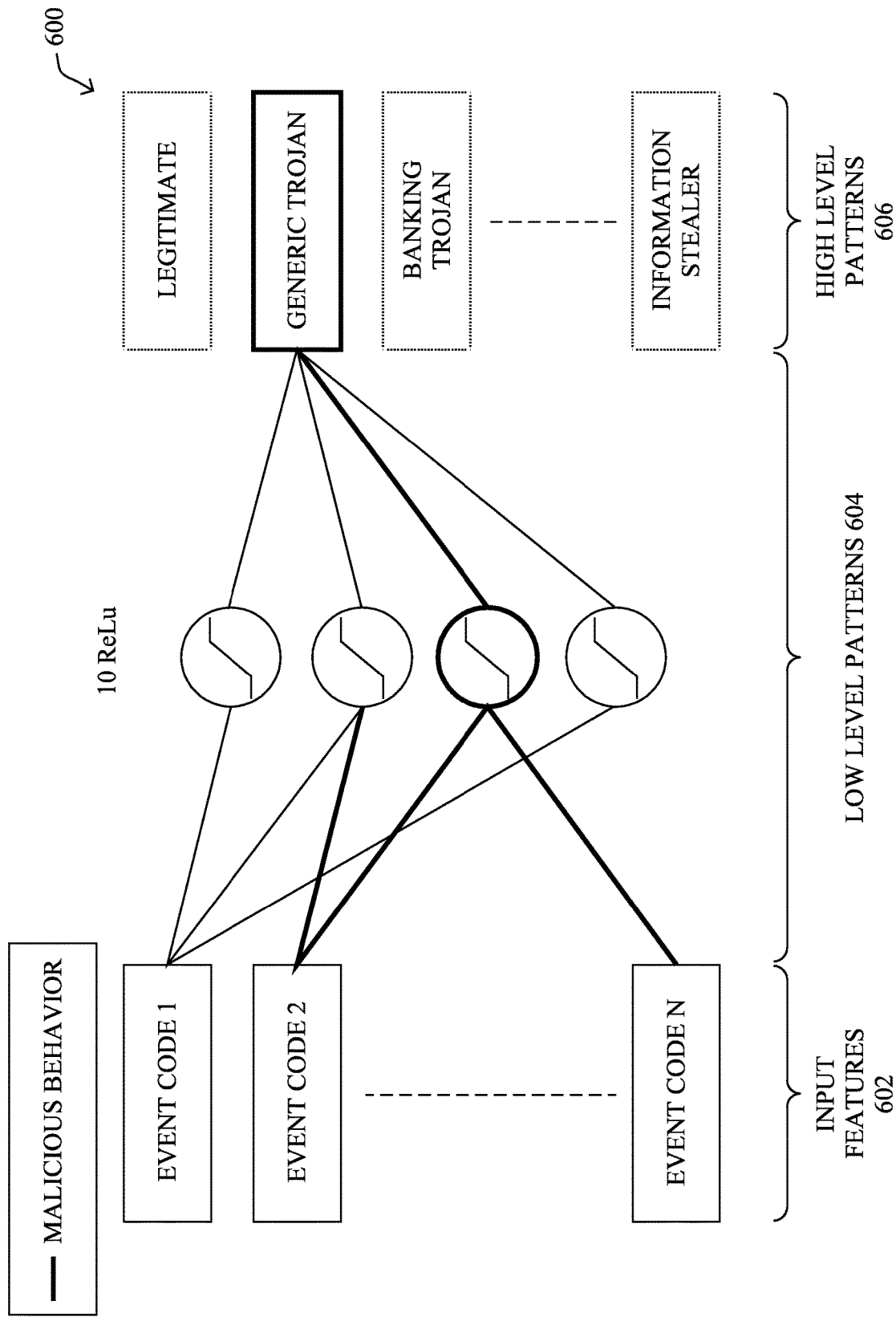

To test neural network 600, the activation of neurons in each layer were tested. For example, FIG. 6B illustrates the activation of neurons in neural network 600 for the Generic Trojan family of malware. From this type of experimentation, neural network 600 was able to learn generalized classification rules in its hidden layer. Neurons in the first layer of neural network 600 react on some similar network events which, together, can be called a high level activity that is responsible for some part of the lifecycle of the malware.

Figure 6C:
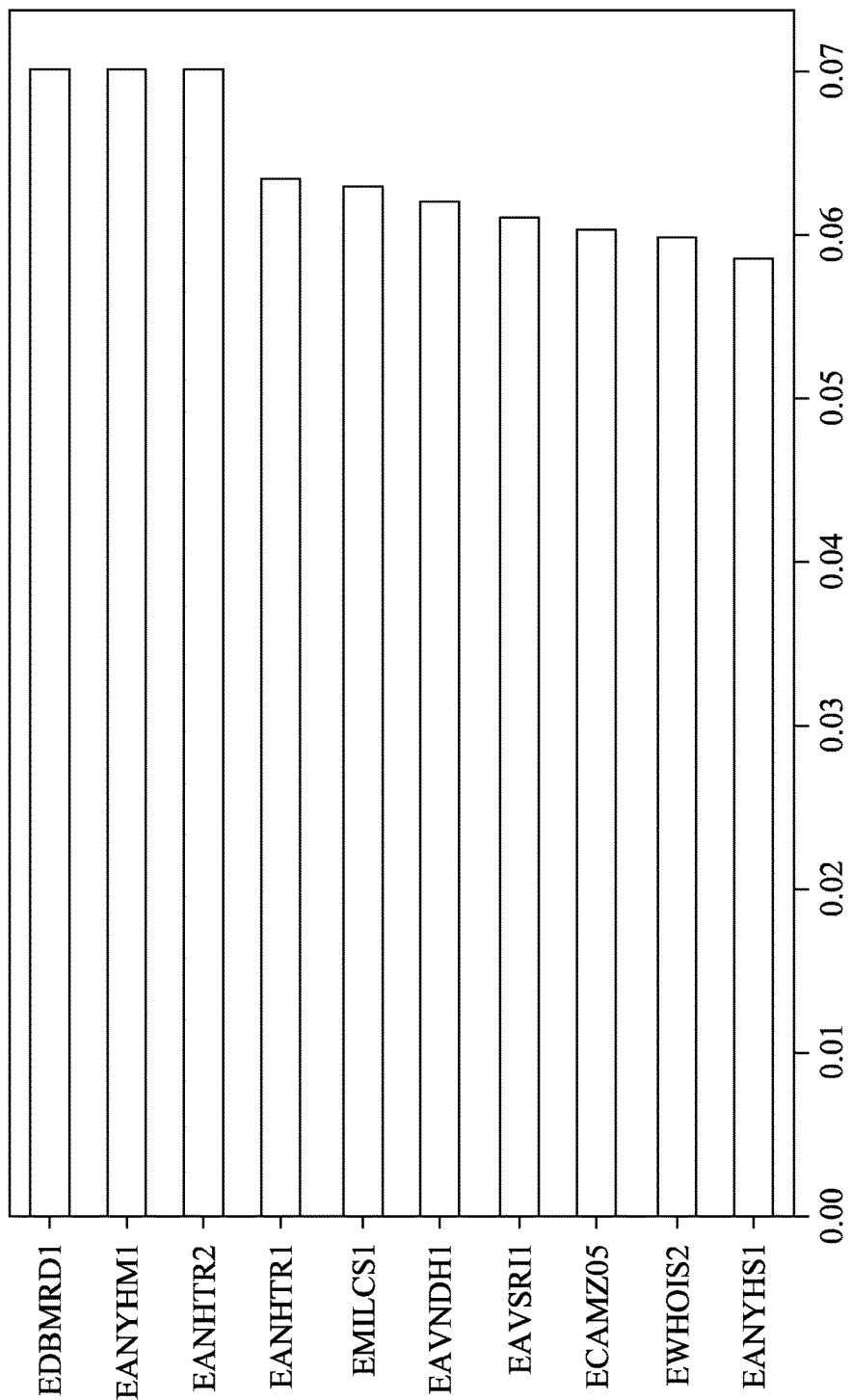

More specifically, it was found that the Generic Trojan output of neural network 600 is sensitive to the following events, which were represented as event codes and are shown in plot 610 in FIG. 6C:
  EDBMRD1 (102)—Download Binary from Malware Related Domain
  EANYHM1 (10)—Known malicious Anyconnect Hash
  EANHTR2 (9)—very anomalous recurring flow sequence
  EANHTR1 (8)—very anomalous flow sequence
  EMILCS1 (135)—generic multi-instance learning classifier maliciousness verdict
  EAVNDH1 (37)—Very young domain
  EAVSRI1 (41)—Flow to Raw Ip
  ECAMZ05 (72)—Known malicious URL pattern
  EWHOIS2 (187)—Suspicious Whois Inference
  EANYHS1 (11)—Suspicious Anyconnect Hash All of the above events represent three basic types of high level activities:
  1. Download of Malicious/Suspicious Binary, involves the following event codes: EDBMRD1, EANYHM1, EANYHS1, EMILCS1
  2. Communications to Suspicious Server, involving the following event codes: EAVNDH1, EAVSRI1, EWHOIS2
  3. Suspicious Communication Pattern, involving the following event codes: EANHTR2, EANHTR1, ECAMZ05

With more neurons in the hidden layer, these higher level activities/patterns/behaviors will be represented each by a separate neuron in neural network 600. This is already a huge advantage when compared to standard rule mining, which is too strict and not able to find the higher level activities.

Taking closer attention to the groups, it can be seen that they represent very generic malicious behaviors. This is not surprising in the case of neuron activations for the Generic Trojan malware family. Looking at the activations for a more specific class, such as the Banking Trojan malware family, the neurons in the hidden layer of the prototype neural network 600 were found to be sensitive to the following signals:
  ERATRO1 (143)—Remote access tool
  EWHOIS2 (187)—Suspicious Whois Inference
  ETYPOS3 (140)—BankTyposquatting
  Scareware (199)—Scareware
  EUHTTR1 (181)—Unusual_HttpTraffic
  ETUOVH1 (178)—TunnelingOverHttps
  ETYPOS1 (142)—Typosquatting
  EGDLIK1 (123)—GeneratedDomainLike Here, two groups of behaviors were observed:
1. Suspicious destination, involving the following: EWHOIS2, ETYPOS3, Scareware, ETYPOS1, EGDLIK1
2. Suspicious communication pattern, involving the following: ERATRO1, EUHTTR1, ETUOVH1

Thus, in the more specific case of Bank Trojans, more specific behaviors, such as Bank typosquatting or scareware, were found. Such a scenario may entail a device infected with a scareware delivering a message to the user about a suspicious activity on his/her account, together with a link to the bank. That link would be typosquatted or generated and would actually lead to fake domain that would probably look similar to real bank homepage. Furthermore, some malicious RAT can be delivered through that link or even the user him/herself can be asked to install it in case he/she encounters any issues and it all can still look like a legitimate communication with the bank support service. Thus, the techniques herein are able to link such information together in such a way that allows a user to better understand the behaviors involved in such a malicious condition.

Figure 7:
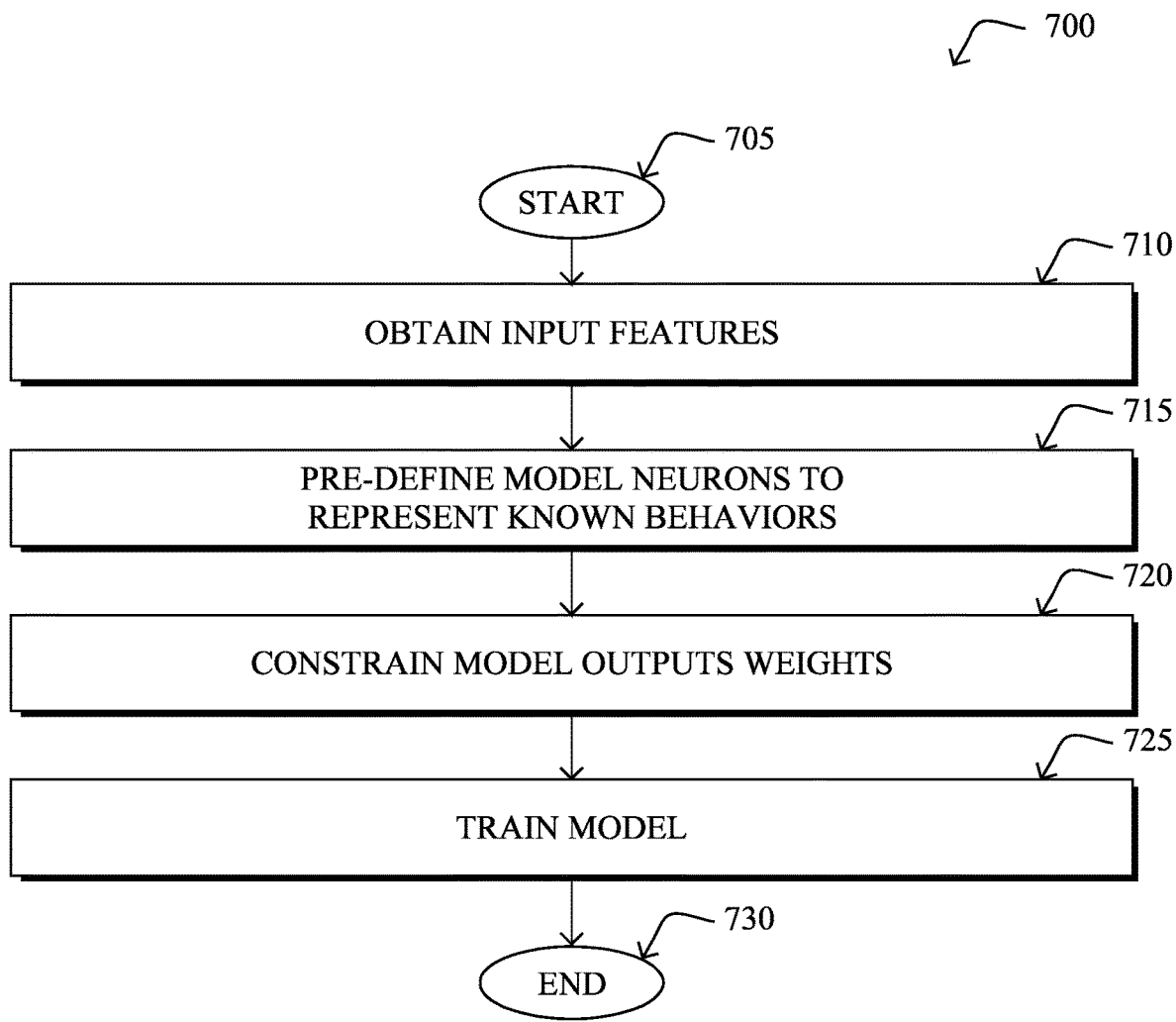
FIG. 7 illustrates an example simplified procedure for training a neural network-based model.

FIG. 7 illustrates an example simplified procedure for procedure for training a neural network-based model, in accordance with one or more embodiments described herein. For example, a non-generic, specifically configured device may perform procedure 700 by executing stored instructions, such as analysis process 248, to analyze telemetry data collected from one or more devices in a network. The procedure 700 may start at step 705, and continues to step 710, where, as described in greater detail above, device may receive input features for a neural network-based model. In various embodiments, the input features may represent computer network events (e.g., the presence of certain data features captured in network telemetry data), system log events, the code structures of an executable, or the like. The neural network-based model may be a discriminative model (e.g., a classifier) or may be a generative model, such as a GAN, in various embodiments.

At step 715, as detailed above, the device may pre-define a set of neurons of the model to represent known behaviors associated with the input features. For example, the pre-defined neurons may represent knowledge provided by an expert user regarding known behaviors.

At step 720, the device may constrain weights for a plurality of outputs of the model, as described in greater detail above. For example, the weights for the plurality of outputs of the model may be constrained to be binary or near-binary. Similarly, some of the weights in the middle layer of the neural network may be set to be binary or near-binary, so as to make their connections to the input features sparse.

At step 725, as detailed above, the device may train the neural network-based model using the constrained weights for the plurality of outputs of the model and by excluding the pre-defined set of neurons from updates during the training. Thus, the neural network will learn a behavioral vocabulary that can be easily understood by a user. In turn, in some cases, the device may deploy the trained neural network-based model for use to detect malicious computer network conditions in one or more computer networks (e.g., to a cloud-based service, to a particular security apparatus, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the learning of malicious behavior vocabulary and threat detection through behavioral matching, it is to be understood that various other adaptations and modifications may be made within the spirit and scope of the embodiments herein. For example, while certain embodiments are described herein with respect to using certain models for purposes of this identification, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A tangible, non-transitory, computer-readable medium storing program instructions that, when executed by one or more processors, cause a device to perform operations comprising:
    selecting a first set of pre-defined weights associated with a first set of neurons, and a second set of weights associated with a second set of neurons;
    performing a training procedure on a neural network model, wherein the training procedure includes excluding the first set of pre-defined weights associated with a first set of neurons from updating during the training while updating the weights associated with the second set of neurons.

2. The tangible, non-transitory, computer-readable medium storing program instructions of claim 1 wherein the first set of pre-defined weights associated with the first set of neurons has weights defined from a previous training procedure.

3. The tangible, non-transitory, computer-readable medium storing program instructions of claim 1, wherein the operations further comprise receiving the first set of pre-defined weights associated with the first set of neurons.

4. The tangible, non-transitory, computer-readable medium storing program instructions of claim 1 wherein the neural network model is a discriminatory model.

5. The tangible, non-transitory, computer-readable medium storing program instructions of claim 1 wherein the neural network model is a generative model.

6. The tangible, non-transitory, computer-readable medium storing program instructions of claim 1, wherein the operations further comprise:
    prior to performing the training procedure on the neural network model, constraining a plurality of the weights in the first set of weights to a lower precision.

7. The tangible, non-transitory, computer-readable medium storing program instructions of claim 6 wherein the weights associated with at least an output layer of the second set of neurons have been constrained to be binary.

8. A method of training a neural network comprising:
selecting a first set of pre-defined weights associated with a first set of neurons, and a second set of weights associated with a second set of neurons;
performing a training procedure on a neural network model, wherein the training procedure includes excluding the first set of pre-defined weights associated with a first set of neurons from updating during the training while updating the weights associated with the second set of neurons.

9. The method of claim 8 wherein the first set of pre-defined weights associated with the first set of neurons had weights defined from a previous training procedure.

10. The method of claim 8, further comprising obtaining the first set of pre-defined weights associated with the first set of neurons.

11. The method of claim 8 wherein the neural network model is a discriminatory model.

12. The method of claim 8 wherein the neural network model is a generative model.

13. The method of claim 8, further comprising:
prior to performing the training procedure on the neural network model, constraining a plurality of the weights in the first set of weights to a lower precision.

14. The method of claim 13 wherein the weights associated with at least an output layer of the second set of neurons have been constrained to be binary.

15. A system specialized for training a neural network comprising:
one or more network interfaces to communicate with a network;
one or more processors coupled to the network interfaces; and
a memory comprising a plurality of storage locations that are addressable by the one or more processors;
wherein a first storage location includes program instructions interpretable by the one or more processors; and
wherein a second storage location includes a data structure interpretable as set of pre-defined weights and a third storage location includes a data structure interpretable as a second set of weights; and
wherein the one or more processors interpret the program instructions and performs operations including:
associating the first set of pre-defined weights with a first set of neurons within a neural network model, and associating the second set of weights with a second set of neurons of the neural network model;
performing a training procedure on the neural network model, wherein the training procedure includes excluding the first set of pre-defined weights associated with a first set of neurons from updating during the training while updating the second set of weights; and
storing the second set of weights in the third storage location.

16. The system of claim 15 wherein the first set of pre-defined weights associated with the first set of neurons had weights defined from a previous training procedure.

17. The system of claim 15, wherein the operations further include obtaining the first set of pre-defined weights via the one or more network interfaces.

18. The system of claim 15 wherein the neural network model is a discriminatory model.

19. The system of claim 15 wherein the neural network model is a generative model.

20. The system of claim 15, wherein the operations further include:
prior to performing the training procedure on the neural network model, modifying the first set of weights by constraining a plurality of the weights in the first set of weights to a lower precision.

21. The system of claim 20 wherein the weights associated with at least an output layer of the second set of neurons have been constrained to be binary.

* * * * *

UNITED STATES PATENT AND TRADEMARK OFFICE
CERTIFICATE OF CORRECTION

| | | |
|---|---|---|
| PATENT NO. | : 12,160,429 B2 | Page 1 of 1 |
| APPLICATION NO. | : 18/225517 | |
| DATED | : December 3, 2024 | |
| INVENTOR(S) | : Petr Somol et al. | |

It is certified that error appears in the above-identified patent and that said Letters Patent is hereby corrected as shown below:

In the Specification

Column 4, Line 21 please amend as shown:
the term "Internet of Things" or "IoT" refers to uniquely identi- Column 14, Line 26 please amend as shown:
thereof. Accordingly, this description is to be taken only by Signed and Sealed this
Eleventh Day of March, 2025

Coke Morgan Stewart
*Acting Director of the United States Patent and Trademark Office*